Patented Aug. 6, 1940

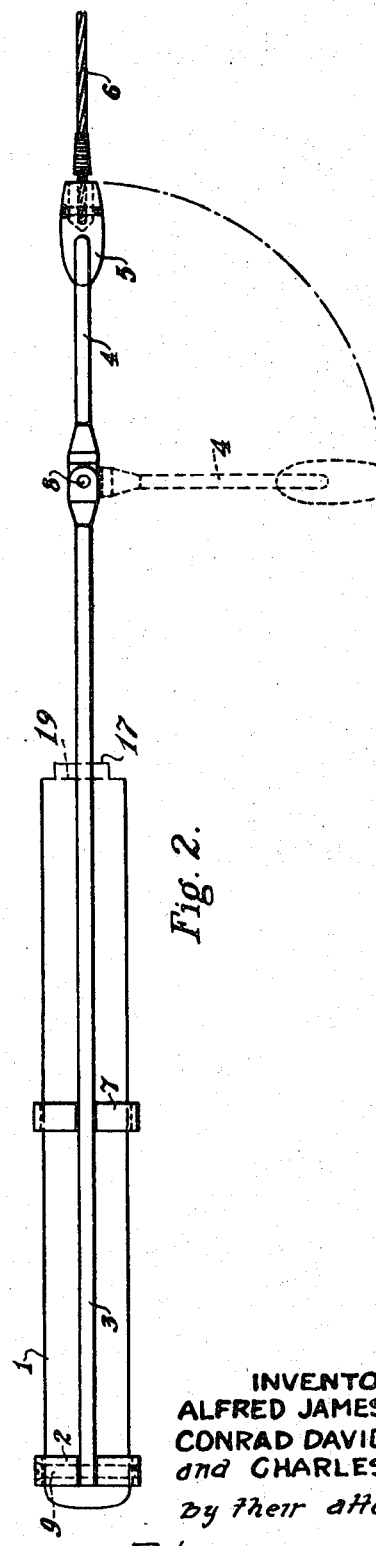

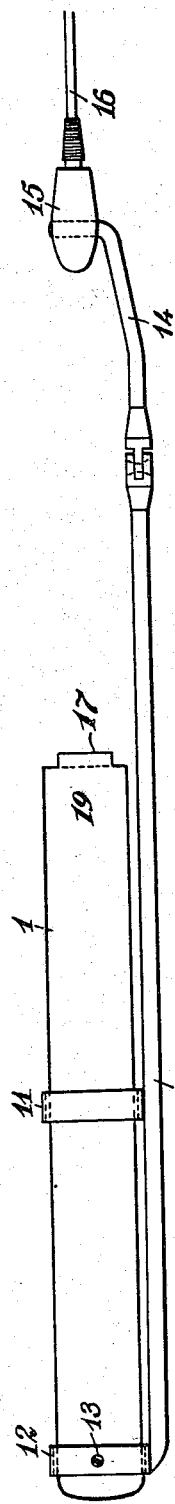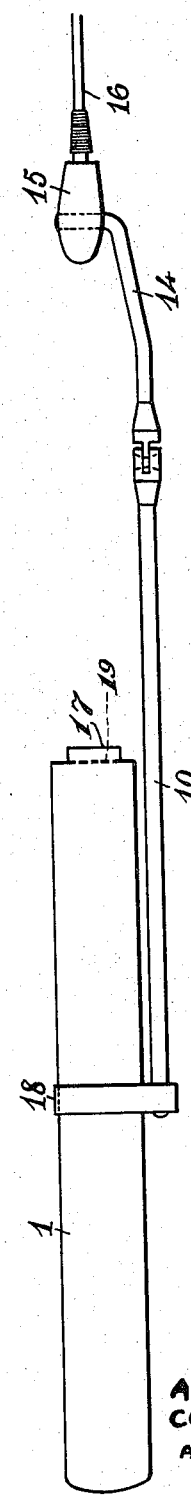

2,210,820

UNITED STATES PATENT OFFICE 2,210,820

ROCKET OR PROJECTILE FOR USE IN THROWING LINES

Alfred James Schermuly, Conrad David Schermuly, and Charles Schermuly, Newdigate, England, assignors to The Schermuly Pistol Rocket Apparatus Limited, Newdigate, England, a British company Application November 26, 1938, Serial No. 242,611
In Great Britain September 3, 1937

3 Claims. (Cl. 102—34)

This invention relates to rockets, or projectiles (hereinafter referred to as a rocket) for use in throwing a line. Generally it has been the practice to attach the line to the rear end or to a perpendicular extension on the rear end of a stick secured to, and parallel throughout its length with, the side of a projectile. In this arrangement, owing to the connection of the line to the stick being out of alignment with the axis of the projectile, the said projectile is subjected to a side-way drag when in flight which diverts it from its true course. In another arrangement the line has been attached to the loop of a flexible element, such for example as the loop of a light chain, or wire, the ends of which are attached to the rocket at diametrically opposite parts thereof. In this arrangement the loop, owing to its flexibility, is liable to become entangled with the line attached thereto or to some relatively fixed element and it is also liable to be destroyed, or injuriously affected, when the rocket is in flight, by the heat of the propelling gases issuing from the choke of the said rocket.

This invention has for its object to provide improved means for attaching the line to the rocket whereby the aforesaid disadvantages are eliminated.

The present invention consists in a rocket or projectile for use in throwing a line, wherein the stick is constituted by a rod or rods extending parallel to, and rigidly mounted on, the rocket and another rod pivotally connected to the rear end of the first mentioned rod or to each of the said first mentioned rods respectively, to which one end of the line is connected, the arrangement being such, that when the rocket is set in position for firing, the rear or hinged portion of the stick can be turned clear of the rocket supporting means but, as soon as the rocket commences its flight, the said rear portion will turn into alignment with a plane through the axis of the rocket by momentum. The combined length of the pivotally connected rods may be equal, or approximately equal, to the length of the sticks hitherto employed. If desired the inturned portion of the hinged rod, or rods, may be secured to a conoidal, or other suitably shaped, element adapted to spread the rearward portion of the stream of gases issuing from the choke of the rocket radially outward which will assist in ensuring stable flight.

The invention will hereinafter be described, by way of example, with reference to the accompanying drawings in which:

Figure 1 is a plan of a rocket with a pair of rods in position;

Figure 2 is a side elevation of the rocket according to Figure 1;

Figure 3 shows a modification of the invention wherein only two rods are used; and Figure 4 shows a further modification of the invention.

Referring to the Figures 1 and 2, in any suitable position on the side of the rocket casing 1, which contains a charge 10, is a lug or collar 2 in which are secured the ends of a pair of diametrically opposed rods 3 which constitute the forward portion of the rocket stick. The rear ends of these rods project a suitable distance beyond the rear end or choke 11 of the rocket and have pivotally connected thereto the ends of a rod 4 which constitutes the rearward portion of the stick, the overall length of the rods 3 and the bent rod 4 being equal, or approximately equal, to the length of the rocket sticks hitherto employed. The rod 4 is bent into a U-shape and has an attachment 5, to which the end of the line 6 is connected, secured in such position thereto that, when the rocket is in flight and the hinged rod 4 moves, by momentum, into alignment with the fixed rods 3, the axis of the said attachment will be in alignment with the axis of the rocket. The portion of the attachment opposed to the rear end of the rocket is conoidal in shape, which will act to spread the rearward portion of the stream of gases issuing from the said choke radially outward which will assist in ensuring stable flight. When the arrangement of rods as shown in Figures 1 and 2 of the drawings is employed and it is desired that they shall easily be removable from the casing of a spent rocket and be removably secured to the casing of an unfired rocket, this may be effected by securing the rocket to the lug or collar 2— by means of a set-screw 9 or the like which passes diametrically through the head of the rocket. The collar 7 prevents lateral movement and is normally secured to the fixed rods at any desired part of their length, through which collar the rocket can be slid.

In rockets intended to be fired from a piston, gun, or the like, the aforesaid lug, secured to the rocket casing, or the aforesaid collar secured between the normally fixed rods is in such position as to permit the required length of the rear portion of the rocket to enter the barrel of the pistol, gun, or the like, from which it is to be fired and discharged.

The rods 3, 4 are preferably pivotally connected by a pin, 8, passed through holes in the opposed ends of the said rods.

In the modification shown in Figure 3 only one rod 10 is rigidly secured to and arranged parallel with the rocket 1, the said rod being soldered or otherwise secured to the collar 11 and at the extreme end to a lug or collar 12 through which a set screw 13 is passed into the casing of the rocket 1. The rear end of the rod 10 is pivotally connected, as in Figures 1 and 2, to a bent rod 14 to which is secured a conoidal attachment member 15 carrying the rope 16. The action of this modified form of the device is similar to that described with reference to Figures 1 and 2, the only difference being that one of the rods running parallel with the rocket casing is eliminated and half of the U-shaped rod is removed.

The modification of the invention shown in Figure 4 comprises a collar 18 soldered or otherwise secured to the casing of the rocket 1. In this case the rod 10 is screwed into the collar 18 and the lug or collar 12 is eliminated.

In the form of the device shown in Figures 1, 2 and 3, the rocket casing can easily be removed from the rod or rods by unscrewing the set screws 9 or 13 as the case may be, and an unfired rocket inserted in the collars and secured thereto by the said set screw. In this manner the rods may be utilised many times. In the form of the invention shown in Figure 4, the rod may be unscrewed from the collar 18 and a fresh charge inserted, but in this case a special charge having a collar secured thereto would have to be used.

What we claim is:

1. A rocket for use in throwing a line, comprising in combination a body portion and a stick portion, said body portion including a conventional charge and means for discharging propulsive gases from the rear end of said body portion, and said stick portion comprising at least one rod extending parallel to and rigidly mounted on the outside of said body portion, and another rod pivoted to the end of the first mentioned parallel extending rigidly mounted rod, and means carried by said second mentioned rod and adapted to be secured to one end of said line, said last mentioned means being so positioned with respect to said first mentioned means and the gases issuing therefrom and so shaped as to maintain, under the influence of said gases, said second mentioned rod in a plane through the longitudinal axis of said body during flight.

2. A rocket for use in throwing a line, comprising in combination a body portion and a stick portion, said body portion containing a conventional charge for discharging propulsive gases from the rear end of said body portion, and said stick portion comprising rod means extending parallel to and rigidly mounted on said body portion, other rod means pivotally connected to the rear end of the first mentioned rod means, and means secured on said other rod means and adapted to spread the propulsive gases discharged from the rear end of said body portion radially outward, thereby assisting in stabilising the flight of said rocket, said spreading means comprising a conoidal member.

3. A rocket for use in throwing a line, comprising a body portion and a stick portion, said stick portion comprising rod means extending parallel to and rigidly mounted on said body portion, and other rod means pivotally connected to the rear end of the first-mentioned rod means, and a conoidal shaped member on said other rod means adapted to be secured to one end of the line.

ALFRED JAMES SCHERMULY.
CONRAD DAVID SCHERMULY.
CHARLES SCHERMULY.

CERTIFICATE OF CORRECTION.

Patent No. 2,210,820. August 6, 1940.

ALFRED JAMES SCHERMULY, ET AL.

It is hereby certified that error appears in the printed specification of the above numbered patent requiring correction as follows: Page 1, second column, line 46, for the word "piston" read --pistol--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.

CERTIFICATE OF CORRECTION.

Patent No. 2,210,820.                                              August 6, 1940.

ALFRED JAMES SCHERMULY, ET AL.

It is hereby certified that error appears in the printed specification of the above numbered patent requiring correction as follows: Page 1, second column, line 46, for the word "piston" read --pistol--; and that the said Letters Patent should be read with this correction therein that the same may conform to the record of the case in the Patent Office.

Signed and sealed this 10th day of September, A. D. 1940.

(Seal)                                                        Leslie Frazer,
                                                        Acting Commissioner of Patents.